United States Patent [19]

Kennedy

[11] 4,267,428
[45] May 12, 1981

[54] CONTOURED WELDING ROD

[76] Inventor: George S. Kennedy, Box 445, Edgewater, Fla. 32032

[21] Appl. No.: 60,658

[22] Filed: Jul. 25, 1979

[51] Int. Cl.³ ............................................. B23K 35/06
[52] U.S. Cl. ............................ 219/145.1; 219/137 R; 219/145.23
[58] Field of Search ............ 219/145.1, 145.23, 137 R

[56] References Cited

U.S. PATENT DOCUMENTS

| | | | |
|---|---|---|---|
| 1,332,186 | 2/1920 | Fay | 219/137 R |
| 2,753,428 | 7/1956 | Graham | 219/137 R |
| 2,792,490 | 5/1957 | Risch | 219/137 R |
| 3,515,846 | 6/1970 | Nakamura | 219/137 R |
| 3,770,302 | 11/1973 | Hallenbeck | 219/137 R X |
| 3,999,035 | 12/1976 | Miyao | 219/145.23 X |
| 4,175,227 | 11/1979 | Dasper | 219/146.23 X |

FOREIGN PATENT DOCUMENTS

| | | | |
|---|---|---|---|
| 854628 | 11/1960 | United Kingdom | 219/137 R |
| 1010684 | 11/1965 | United Kingdom | 219/137 R |

*Primary Examiner*—Richard R. Kucia
*Attorney, Agent, or Firm*—Duckworth, Hobby, Allen, Dyer & Pettis

[57] ABSTRACT

A contoured welding rod forms a stringer bead to couple the adjacent bevelled end surfaces of an aligned pair of metal pipes or metal sheets. The welding rod is fabricated from an uncoated alloy metal and has an upper section which includes symmetrical side surfaces inclined at an angle equal to the angle of inclination of the bevelled end surfaces of the pipes or sheets. The rod also includes a lower section which is coupled to the lower portion of the upper section and is dimensioned to penetrate through the gap between the adjacent bevelled end surfaces of the pipes or sheets. During the welding operation the upper section of the rod joins the bevelled surfaces of the pipes or sheets, while the lower section of the rod joins the surfaces of the pipes or sheets on the opposite side of the gap between the pipes or sheets.

9 Claims, 9 Drawing Figures

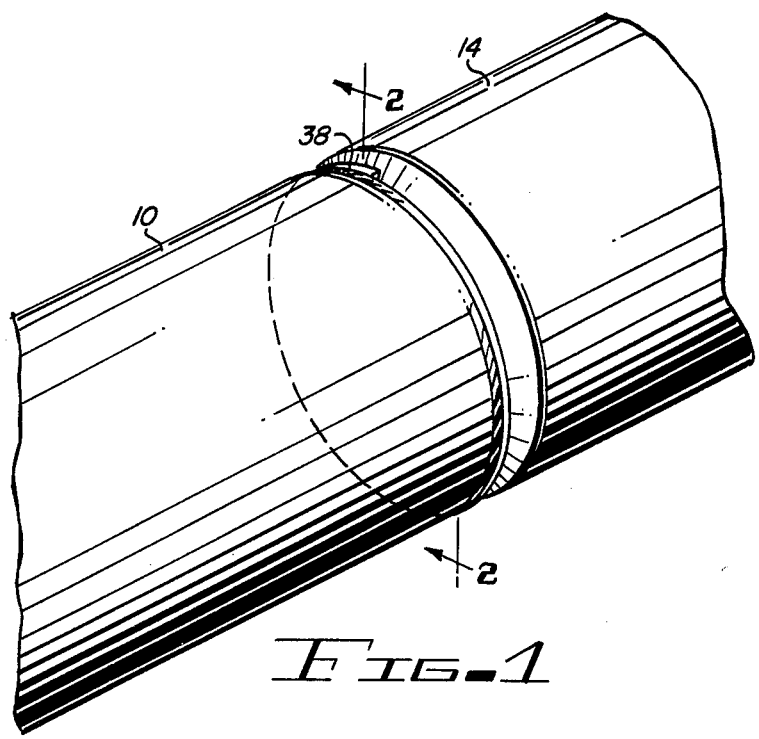
Fig-1
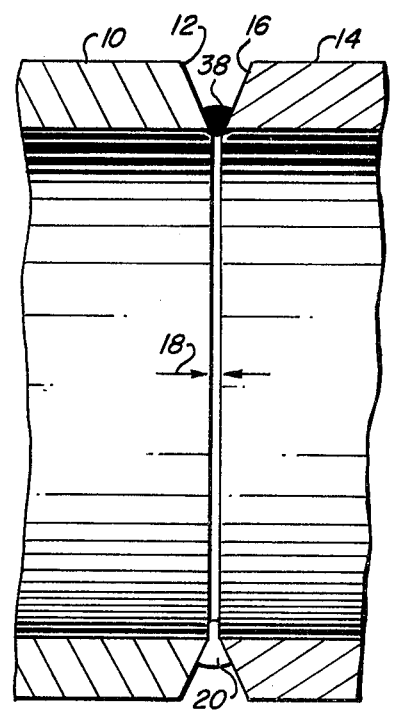
Fig-2
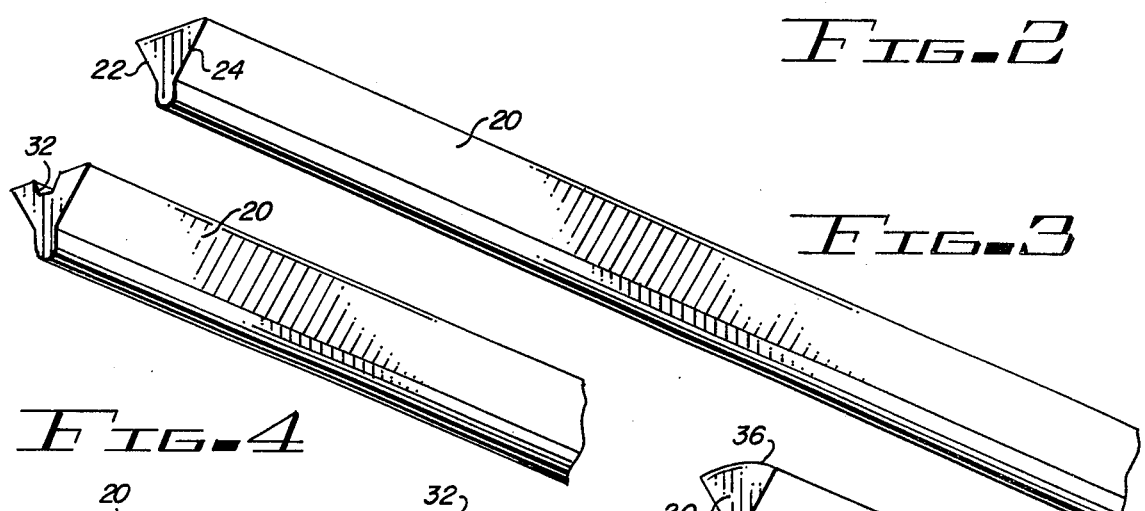
Fig-3
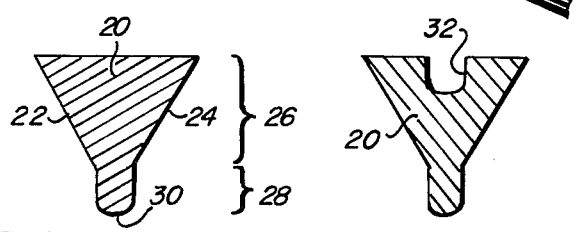
Fig-4
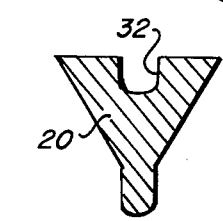
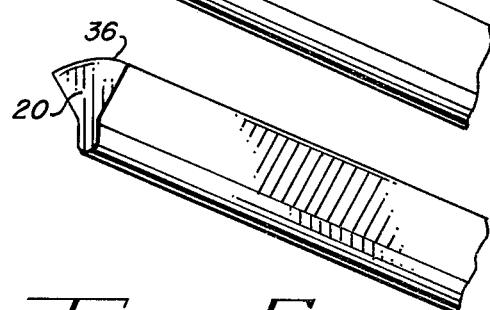
Fig-5
Fig-6  Fig-7
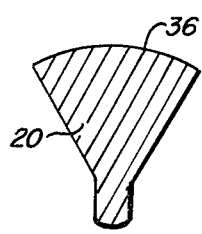
Fig-8
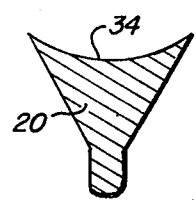
Fig-9

CONTOURED WELDING ROD

BACKGROUND OF THE INVENTION

1. Field of the Invention

The present invention relates to welding rods, and more particularly, to uncoated triangular metal alloy welding rods having a uniquely configured channel shaped lower section.

2. Description of the Prior Art

Heli-arc welding systems utilize a shield of argon gas to block out the ambient atmosphere at the welding point to substantially reduce contamination of the welded seam. The ends of steel pipes or steel plates which are joined together by heli-arc welds generally have 37.5 degree bevelled ends. Prior to commencing the welding operation, the steel plates or steel pipes are carefully aligned and positioned with about a ⅛ inch gap between the adjacent sections of the bevelled ends.

The initial stage of the welding process involves forming a first pass or stringer bead in which one part of the welded seam must bridge the gap between the surfaces of the bevelled ends of the two elements to be joined together while another portion of the seam must join together the inside surfaces of the pipes or steel plates. The penetration of the welded bead onto both sides of the aligned ends of the steel pipes or steel plates is essential to form a perfect weld. The primary problem in the heli-arc welding technology is that the precisely required stringer bead penetration cannot be uniformly attained.

Welders using present day heli-arc welding techniques almost exclusively use round welding rods to form the stringer bead in the V-shaped groove formed by the bevelled ends of adjacent steel plates or steel pipes. Since the circular cross section of the round welding rod and the V-shape of the groove are geometrically incompatible, it is extremely difficult to form a perfect welded seam and often as many as 40% of the finished welds fail to pass inspection. When a weld fails to pass inspection, the welded junction must be cut out and redone at substantial cost.

U.S. Pat. No. 3,999,035 (Miyal) discloses numerous types of arc welding electrodes having various geometric configurations for the flux coated welding rods. Column 5 and FIGS. 8C and 8D of this patent disclose a triangular shaped, flux coated welding electrode.

U.S. Pat. No. 3,515,846 (Nakamura) discloses a multi-layered arc welding electrode having a generally triangular cross section. As illustrated in FIGS. 6 and 7, the Nakamura arc welding electrode is positioned within a groove between two metal plates and has length and width dimensions approximately equal to the dimensions of the groove to be welded.

U.S. Pat. No. 2,410,461 (Ronay) discloses a multi-layered, hollow core arc welding electrode. U.S. Pat. No. 2,148,182 (Applegate) discloses a generally triangular shaped arc welding electrode having a strip of inorganic material coupled to the rear surface thereof which is intended to fit snugly within a corner well where the welded seam is to be placed. The strip of inorganic material shields the arc and confines it to the region of the weld. Metal splatter is thus avoided and the weld metal is uniformly distributed in the corner of the joint.

The following U.S. Pat. Nos. disclose various other types of welding electrodes: 1,788,310 (Lebrun et al); 3,114,033 (Elster et al); 2,785,285 (Bernard); 2,042,899 (Howland) and 3,043,946 (Perrin).

SUMMARY OF THE INVENTION

It is therefore a primary object of the present invention to provide a contoured welding rod having an upper section which includes symmetrical side surfaces which are inclined at an angle equal to the angle of inclination of the bevelled end surfaces of adjacent steel pipes or steel sheets and a lower section coupled to the upper section which is dimensioned to penetrate through the gap between the adjacent end surfaces of the steel pipes or steel sheets to precisely control the amount of welding rod metal which is deposited on the interior surface of the welded seam joining adjacent pipes or adjacent plates.

Another object of the present invention is to provide a contoured welding rod which assures uniform penetration of the welding rod along the entire length of the gap between adjacent steel pipes or steel plates.

Yet another object of the present invention is to provide a contoured welding rod having a lower section which penetrates through and fills the gap between adjacent steel pipes or steel plates.

Yet another object of the present invention is to provide a contoured welding rod intended for use only during the formation of the stringer bead.

Briefly stated, and in accord with one embodiment of the invention, a contoured welding rod forms a stringer bead to couple the adjacent bevelled end surfaces of an aligned pair of metal pipes or metal sheets. The welding rod of the present invention comprises an uncoated alloy metal rod having an upper section which includes symmetrical side surfaces inclined at an angle equal to the angle of inclination of the bevelled end surfaces of the pipes or sheets. The rod also includes a lower section which is coupled to the lower portion of the upper section and which is dimensioned to penetrate through the gap between the adjacent bevelled end surfaces of the pipes or sheets. During the welding operation the upper section of the rod joins the bevelled surfaces of the pipes or sheets while the lower section of the rod joins the surfaces of the pipes or sheets on the opposite side of the gap.

DESCRIPTION OF THE DRAWINGS

The invention is pointed out with particularity in the appended claims. However, other objects and advantages, together with the operation of the invention may be better understood by reference to the following detailed description taken in connection with the following illustrations, wherein:

FIG. 1 is a perspective view illustrating the manner in which the bevelled end surfaces of adjacent steel pipes are aligned.

FIG. 2 is a sectional view of the pipes illustrated in FIG. 1, taken along section line 2—2, particularly illustrating the configuration of a finished weld and the positioning of a contoured welding rod of the present invention within the gap between the two adjacent pipes.

FIG. 3 illustrates one embodiment of the contoured welding rod of the present invention.

FIG. 4 illustrates another embodiment of the contoured welding rod of the present invention in which a notch is positioned in the upper surface.

FIG. 5 illustrates another embodiment of the contoured welding rod of the present invention in which the upper surface of the rod is raised.

FIGS. 6–9 are sectional views of various different configurations of the upper surface of the contoured welding rod of the present invention.

DESCRIPTION OF THE PREFERRED EMBODIMENT

In order to better illustrate the advantages of the invention and its contributions to the art, preferred hardware embodiments of the invention will now be described in some detail.

Referring to FIGS. 1, 2 and 3, the contoured welding rod of the present invention is typically used to lay down the stringer bead. The stringer bead is the initial and most critical bead which first joins together adjacent steel pipes or steel plates.

In FIG. 1, a steel pipe 10 includes a bevelled end surface 12 which is generally inclined at a 37.5 degree angle to the vertical. A second pipe 14 also includes a 37.5 degree bevelled end surface 16. Pipes 10 and 14 are carefully aligned so that bevelled surfaces 12 and 16 are adjacent one another and a gap indicated by arrow 18 of approximately ⅛ inch is maintained between pipes 10 and 14.

Welding rod 20 is typically fabricated from the same metal alloy from which pipes 10 and 14 are fabricated. As can be seen, rod 20 is an uncoated, bare metal rod. Side surfaces 22 and 24 of rod 20 are inclined at the same 37.5 degree angle as the bevelled end surfaces 12 and 16 of pipes 10 and 14. It can be seen from the remaining FIGS. 6–9 that side surfaces 22 and 24 form a generally triangular-shaped upper section, indicated generally be reference No. 26. A lower section, indicated generally by reference No. 28, is coupled to the lower portion of upper section 26 and is dimensioned to penetrate through gap 18 which is formed between the adjacent bevelled end surfaces 12 and 16 of pipes 10 and 14. Thus, if gap 18 is approximately ⅛ inch wide, the width of lower section 28 will be on the order of ⅛ inch. The overall dimensions of rod 20, particularly the angle of inclination of sides 22 and 24 and the depth and width of lower section 28, can be varied as is necessary to conform to the structure in connection with which the welding rod of the present invention is utilized.

In the embodiment illustrated, the vertical dimension of lower section 28 may be on the order of 3/32 of an inch. Typically, the side surfaces of lower section 28 are parallel to one another and the lower portion of this section includes a rounded tip 30 as shown.

Since it is frequently desirable to somewhat vary the metal content deposited by the welding rod during a particular welding operation as a function of the type of material and various other factors, numerous different configurations of the upper surface of rod 20 are provided. FIGS. 4 and 7 illustrate welding rod 20 having a notch 32 in the upper surface thereof to somewhat reduce the overall metal content of the rod. The rod illustrated in FIG. 3 includes an upper surface which is generally perpendicular to the vertical axis of the rod.

FIG. 9 illustrates another embodiment of welding rod 20 in which the upper surface 24 is inwardly rounded to reduce the overall metal content of the rod. FIGS. 5 and 8 illustrate a welding rod 20 having an outwardly rounded upper surface 36 which increases the overall metal content of the rod without increasing the length of side surfaces 22 and 24. Clearly the overall metal content of upper section 26 could also be modified by either reducing or increasing the length of side surfaces 24.

During the welding process, welding rod 20 is positioned as illustrated in FIG. 2 with lower section 28 penetrating through gap 18. The welding equipment precedes the rod and forms a molten puddle at the base of the rod. As the lower section 28 of rod 20 melts, the tip sucks back and forms a welded connection between pipes 10 and 14 on the interior surface of these pipes. Reference No. 38 indicates a completed weld seam which has been formed between bevelled edges 12 and 16 and the interior surfaces of pipes 10 and 14.

After the first pass around the periphery of the pipes has been concluded and the stringer bead has been formed, conventional welding rods and conventional welding techniques are utilized during subsequent multiple passes to build up additional weld seams to fill in the remainder of the bevelled gap between the ends of pipes 10 and 14.

Excessive metal build up inside pipes presents a serious problem when conventional cylindrical welding rods are used to form the stringer bead, but this problem is eliminated when contoured welding rods fabricated in accordance with the disclosure set forth above are used since the contour of the welding rod 20 permits a limited but uniform penetration of the welding rod into gap 18.

To vary the penetration depth or the amount of metal deposited during the formation of the stringer bead, the spacing between adjacent pipes or steel plates can be varied or the overall size of welding rod 20 can be either increased or decreased as required. Typically small, medium and large versions of welding rod 20 will be provided for various types of welding procedures. Welding rod 20 is fabricated from conventional materials. For instance, if two steel alloy pipes are to be joined together, a steel alloy welding rod will be provided in which the steel alloy in the rod is identical to the steel alloy of the pipes.

While the description of the present invention has been limited to the heli-arc welding process, it is evident that the configuration of the welding rod of the present invention can be used in connection with other related types of welding procedures where bevelled ends of cylindrical pipes or steel plates are joined together in the manner illustrated in FIGS. 1 and 2.

It will be apparent to those skilled in the art that the disclosed contoured welding rod may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A hand-held welding rod for forming a stringer bead to fill the lower portion of the gap lying between adjacent beveled end surfaces of an aligned pair of metal pipes or metal sheets having an upper and a lower surface, each of said beveled end surfaces intersecting the upper surface at an obtuse angle and the lower surface at an acute angle, said welding rod comprising:

a. an uncoated alloy upper section having first and second side surfaces each inclined at an angle to match the angle of inclination of the adjacent beveled end surfaces of said pipe or sheet, said upper section further including an upper surface and a lower surface, wherein the width of the lower surface of said upper section is less than about 30% of the width of the upper surface of said upper section; and b. an uncoated alloy lower section having a lower surface, and an upper surface coupled to and having a width equal to the width of the lower surface of said upper section, wherein the spacing between the upper and lower surfaces of said lower section is less than about 30% of the spacing between the upper surface of said upper section and the lower surface of said upper section;

whereby the lower surface of said upper section fits within the gap between said adjacent pipes or plates causing the entire lower section of said rod to protrude below the lower surface of said pipe or sheet and whereby the mass of the lower section of said rod comprises less than about 25% of the mass of the entire rod while the mass of the upper section comprises more than about 75% of the mass of the entire rod.

2. The welding rod of claim 1 wherein the lower section of said rod includes parallel oriented side surfaces.

3. The welding rod of claim 2 wherein the lower portion of said lower section includes a rounded tip.

4. The welding rod of claim 3 wherein said rod is fabricated from a metal alloy of the same composition as the welding rod.

5. The welding rod of claim 4 wherein said rod includes a vertical axis and wherein the upper surface of said upper section of said rod is oriented perpendicular to the vertical axis.

6. The welding rod of claim 5 wherein the vertical dimension of said rod is substantially less than the thickness of said pipe or sheet.

7. The welding rod of claim 6 wherein the side surfaces of the upper section of said rod are inclined at a 37.5° angle with respect to the vertical axis.

8. The welding rod of claim 4 wherein the upper surface of the upper section of said rod is outwardly rounded.

9. The welding rod of claim 4 wherein the upper surface of the upper section of said rod is inwardly rounded.

* * * * *